United States Patent
Liu et al.

(10) Patent No.: US 12,516,803 B2
(45) Date of Patent: Jan. 6, 2026

(54) ILLUMINATION DEVICE WITH MICRO-LED ARRAY AND INFRARED ARRAY

(71) Applicant: GUANGZHOU LUXVISIONS INNOVATION TECHNOLOGY LIMITED, Guangzhou (CN)

(72) Inventors: Yi-Wei Liu, Guangzhou (CN); Pyng Yu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 18/645,404

(22) Filed: Apr. 25, 2024

(65) Prior Publication Data

US 2025/0067423 A1 Feb. 27, 2025

(30) Foreign Application Priority Data

Aug. 24, 2023 (CN) .......................... 202311074674.1

(51) Int. Cl.
*F21V 23/04* (2006.01)
*F21S 10/00* (2006.01)
(Continued)

(52) U.S. Cl.
CPC .......... *F21V 23/0471* (2013.01); *F21S 10/00* (2013.01); *F21V 5/004* (2013.01); *F21V 5/007* (2013.01);
(Continued)

(58) Field of Classification Search
CPC ...... F21V 23/0471; F21V 5/004; F21V 5/007; F21S 10/00; H21Y 2113/30; G03B 15/05
See application file for complete search history.

(56) References Cited

U.S. PATENT DOCUMENTS 9,291,806 B2 * 3/2016 Holman ................ F21V 7/0083
2013/0294045 A1 * 11/2013 Morgenbrod ........... F21V 5/045
362/1
(Continued)

FOREIGN PATENT DOCUMENTS

CN 102566210 7/2012
CN 202583666 12/2012
(Continued)

OTHER PUBLICATIONS

Song et al., Multispectral mixed type monitoring camera light filling lamp, 2018, CN207815053U, http://worldwide.espacenet.com/patent/search/family/063327041/publication/CN207815053U?q=pn%3DCN207815053U (Year: 2018).*
(Continued)

*Primary Examiner* — Tracie Y Green
*Assistant Examiner* — Michael Chiang
(74) *Attorney, Agent, or Firm* — JCIPRNET

(57) ABSTRACT

The disclosure provides an illumination device including a light-emitting element array, a lens array, an infrared light-emitting element array, at least one light sensing element, and a control unit. The light-emitting element array includes a plurality of micro light-emitting diodes arranged in an array. The lens array includes a plurality of lenses. The infrared light-emitting element array includes a plurality of infrared micro light-emitting diodes arranged in an array form, and the infrared micro light-emitting diodes are respectively configured in the light-emitting element array. Each infrared micro light-emitting diode and the at least one light sensing element are configured to provide a plurality of ranging data. The control unit controls each micro light-emitting diode to generate a plurality of light beams according to the ranging data so as to form a plurality of illumi-
(Continued)

nation light beams, and the illumination light beams illuminate a target in a pixelated form.

12 Claims, 5 Drawing Sheets

(51) Int. Cl.
  *F21V 5/00* (2018.01)
  *G03B 15/05* (2021.01)
  *F21Y 113/00* (2016.01)
  *F21Y 115/10* (2016.01)

(52) U.S. Cl.
  CPC .......... *G03B 15/05* (2013.01); *F21Y 2113/30* (2023.05); *F21Y 2115/10* (2016.08)

(56) References Cited

U.S. PATENT DOCUMENTS

| | | | |
|---|---|---|---|
| 2017/0347086 A1* | 11/2017 | Watanabe | H04N 13/257 |
| 2019/0049097 A1* | 2/2019 | Rossi | F21V 23/003 |
| 2020/0080715 A1* | 3/2020 | Antretter | F21V 23/0478 |
| 2020/0266242 A1* | 8/2020 | Ding | H10K 59/50 |
| 2021/0219394 A1* | 7/2021 | van Der Sijde | H05B 45/10 |
| 2023/0164445 A1* | 5/2023 | van Voorst Vader | H04N 23/74 |
| | | | 348/370 |

FOREIGN PATENT DOCUMENTS

| | | | |
|---|---|---|---|
| CN | 104395817 | | 3/2015 |
| CN | 108267909 | | 7/2018 |
| CN | 207815053 | | 9/2018 |
| CN | 207815053 U | * | 9/2018 |
| CN | 109001927 | | 12/2018 |
| CN | 109373208 | | 2/2019 |
| CN | 210720955 | | 6/2020 |
| CN | 111396774 | | 7/2020 |
| CN | 111818242 | | 10/2020 |
| CN | 113690330 | | 11/2021 |
| CN | 217425686 | | 9/2022 |
| CN | 220584524 | | 3/2024 |
| JP | 2017227686 | | 12/2017 |
| KR | 20220094347 | | 7/2022 |

OTHER PUBLICATIONS

"Office Action of China Counterpart Application", issued on May 23, 2025, p. 1-p. 10.
"Notice of Allowance of China counterpart Application", issued on Nov. 28, 2025, p. 1-p. 4.

* cited by examiner

ILLUMINATION DEVICE WITH MICRO-LED ARRAY AND INFRARED ARRAY

CROSS-REFERENCE TO RELATED APPLICATION

This application claims the priority benefit of China application serial no. 202311074674.1, filed on Aug. 24, 2023. The entirety of the above-mentioned patent application is hereby incorporated by reference herein and made a part of this specification.

BACKGROUND

Technical Field

The disclosure relates to an optical device, and particularly relates to an illumination device.

Description of Related Art

With the popularity of portable electronic devices, the requirements for the specifications of flashes used as one of the components have also increased. For the flashes of the portable electronic devices, how to provide high-quality illumination according to the use environment is an urgent problem to be solved.

SUMMARY

The disclosure provides an illumination device that provides illumination in a pixelated form. The generated illumination light can be adjusted according to a distance of a target to be illuminated, and the illumination effect is favorable.

According to an embodiment of the disclosure, an illumination device is provided, including a light-emitting element array, a lens array, an infrared light-emitting element array, at least one light sensing element, and a control unit. The light-emitting element array includes a plurality of discrete light-emitting areas, where each light-emitting area includes a plurality of micro light-emitting diodes arranged in an array. The lens array includes a plurality of lenses, where the lenses respectively correspond to the light-emitting areas. The infrared light-emitting element array includes a plurality of infrared micro light-emitting diodes arranged in an array form, and the infrared micro light-emitting diodes are respectively configured in the light-emitting element array. The control unit is connected to the micro light-emitting diodes, the infrared micro light-emitting diodes, and the at least one light sensing element. Each infrared micro light-emitting diode and the at least one light sensing element are configured to perform ranging on a target to provide a plurality of ranging data. The control unit controls each micro light-emitting diode to generate a plurality of light beams according to the ranging data. After respectively passing through the lenses, the light beams are formed into a plurality of illumination light beams, and the illumination light beams illuminate the target in a pixelated form.

Based on the above, the illumination device provided by the embodiment of the disclosure uses the infrared micro light-emitting diodes and the light sensing element to perform ranging on the illumination target. The plurality of micro light-emitting diodes emit light according to the ranging result, so that the illumination device can provide optimized illumination according to the distance (location) of the target. The illumination device also uses micro light homogenizing elements for homogenizing and guiding light, thereby providing pixelated, high-quality illumination light.

In order to make the above-mentioned features and advantages of the disclosure clearer and easier to understand, the following embodiments are given and described in details with accompanying drawings as follows.

DESCRIPTION OF THE EMBODIMENTS

Figure 1A:
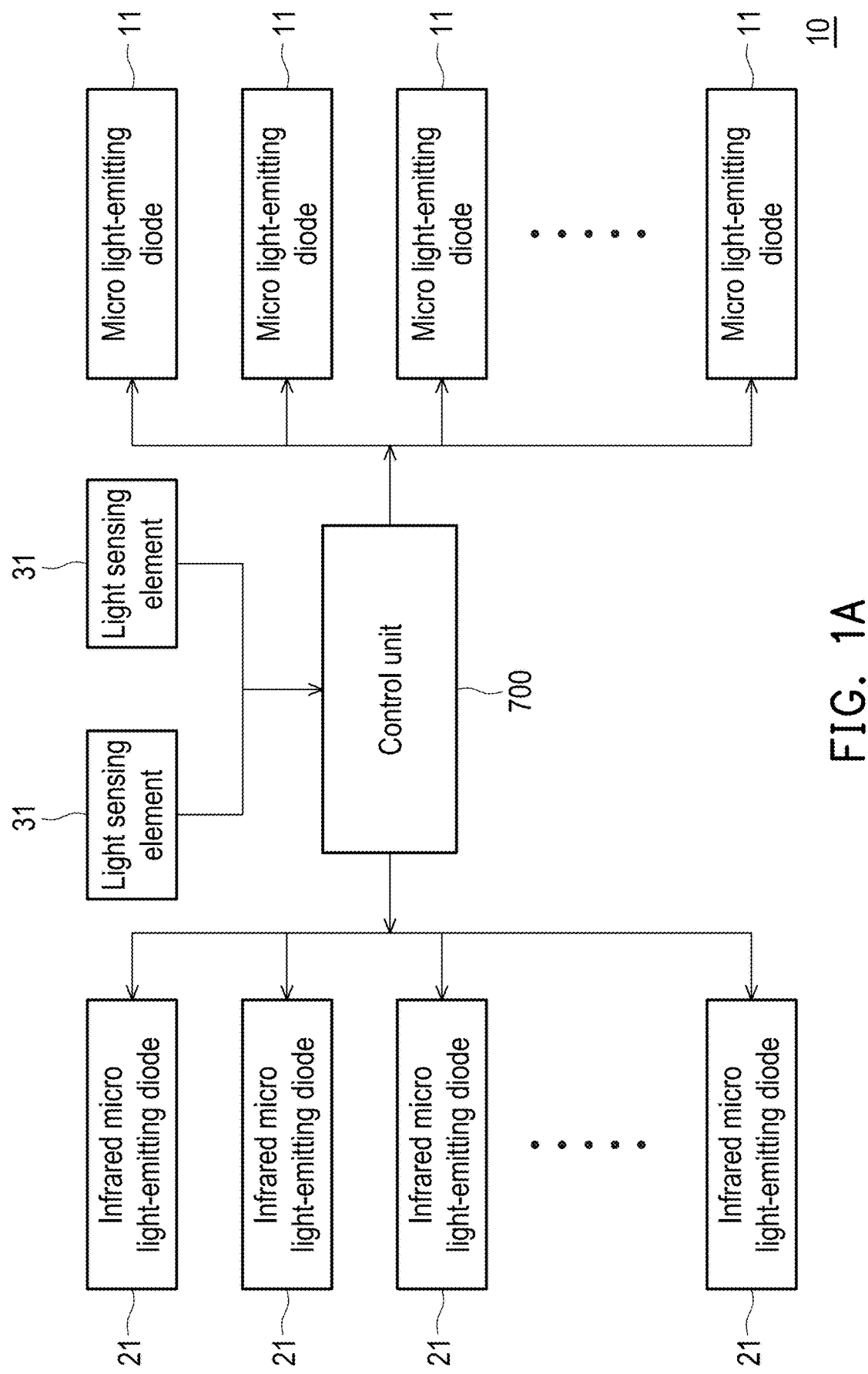
FIG. 1A is a block view of an illumination device according to an embodiment of the disclosure.
Figure 1B:
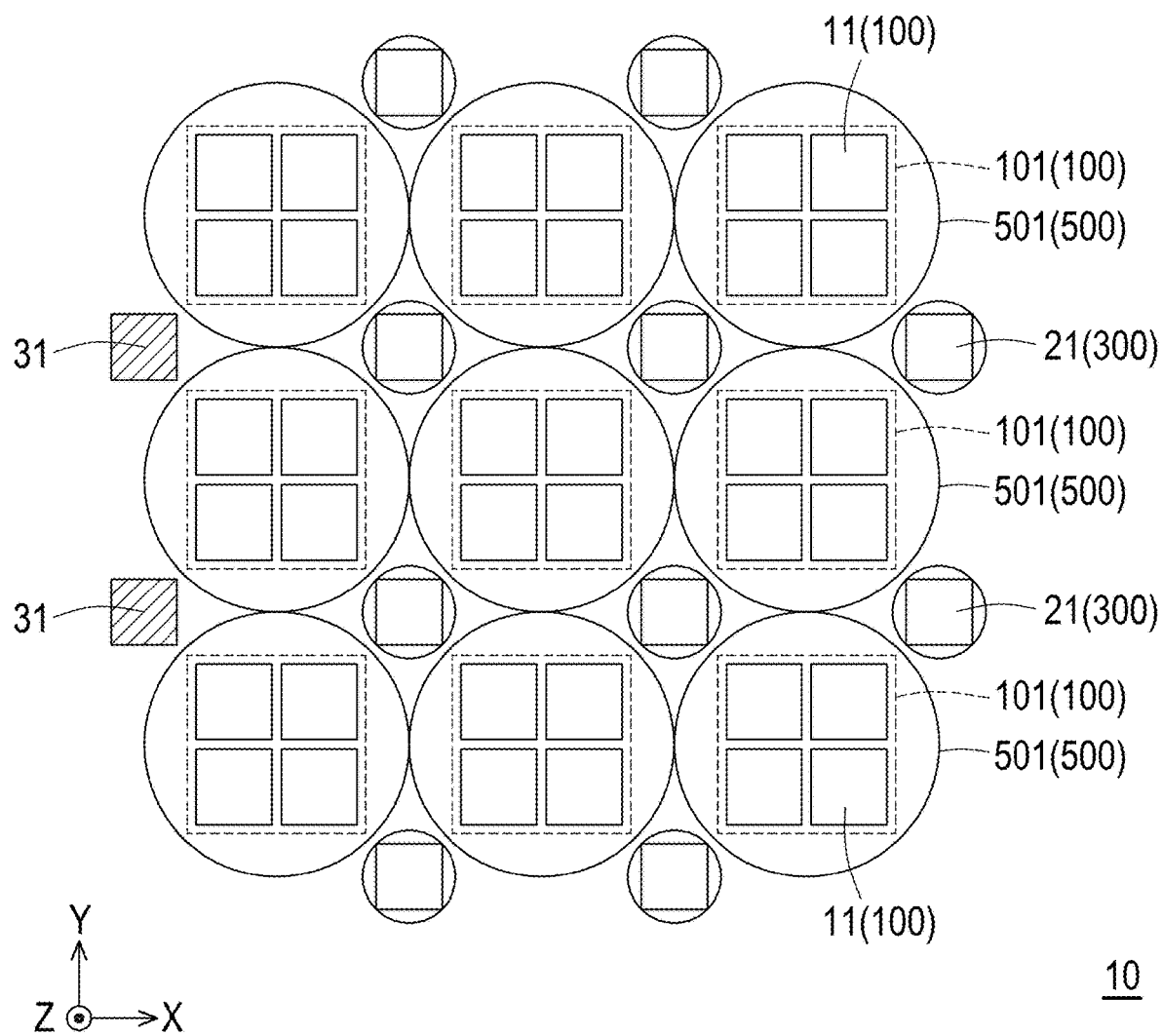
FIG. 1B is a schematic plan view of the illumination device of FIG. 1A.
Figure 1C:
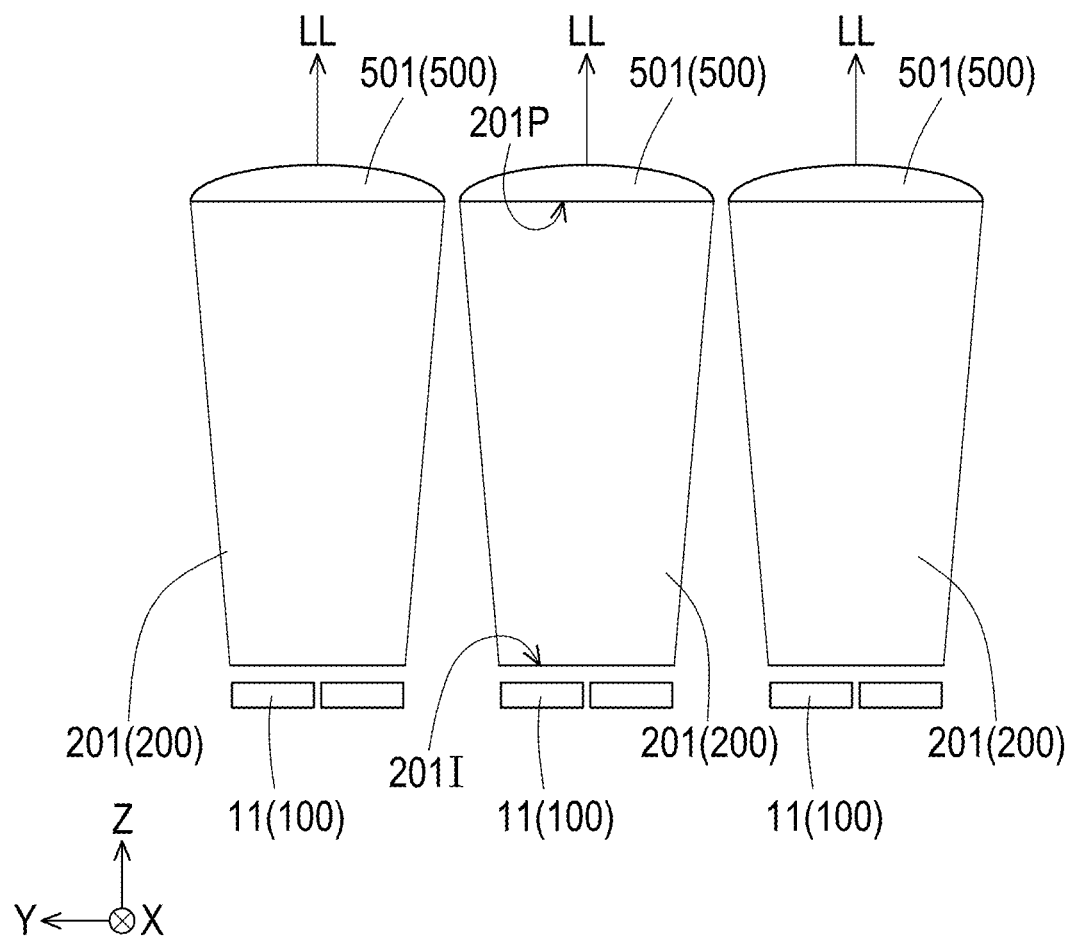
FIG. 1C is a schematic cross-sectional view of the illumination device of FIG. 1A.
Figure 2:
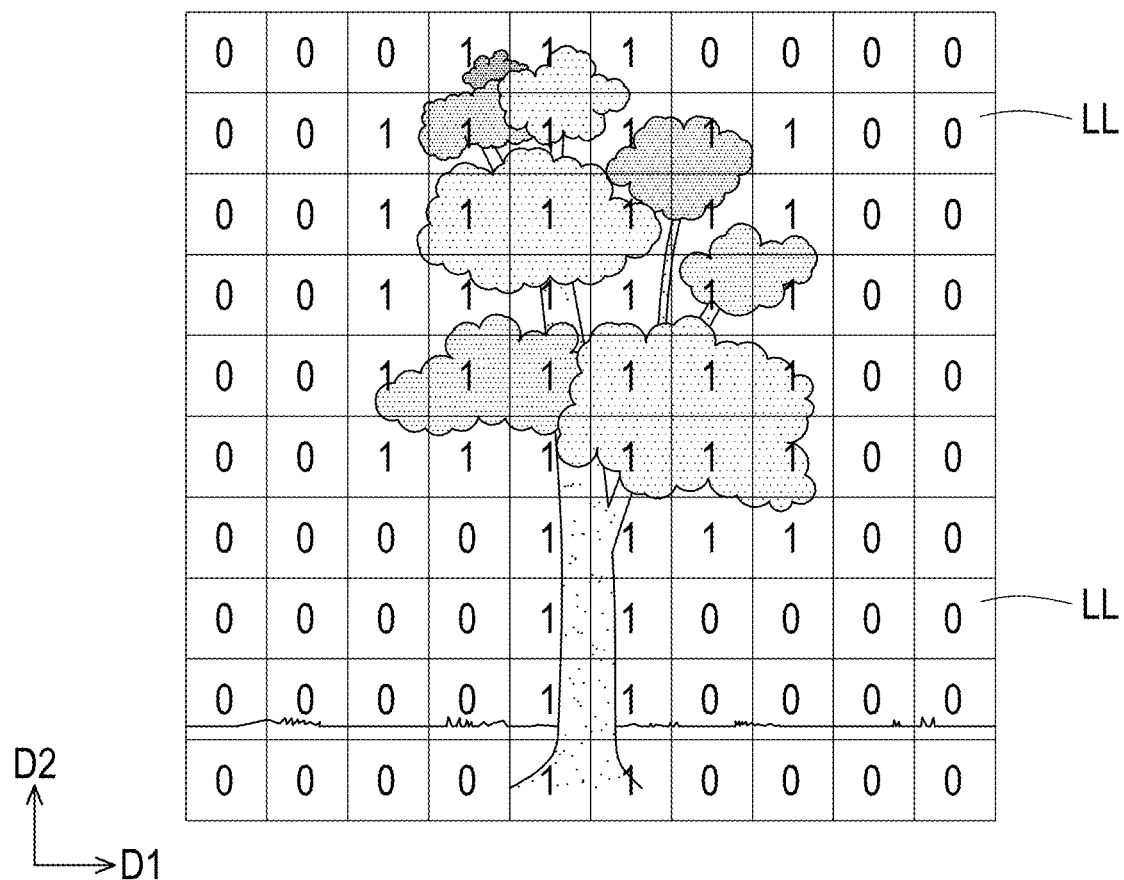
FIG. 2 is a schematic view of pixelated illumination of an illumination device according to an embodiment of the disclosure.

Refer to FIG. 1A to FIG. 2. FIG. 1A is a block view of an illumination device 10 according to an embodiment of the disclosure. FIG. 1B is a schematic plan view of the illumination device 10. FIG. 1C is a schematic cross-sectional view of the illumination device 10. FIG. 2 is a schematic view of pixelated illumination of the illumination device 10 according to an embodiment of the disclosure.

The illumination device 10 includes a light-emitting element array 100, a light homogenizing structure 200, an infrared light-emitting element array 300, a lens array 500, a plurality of light sensing elements 31, and a control unit 700.

The light-emitting element array 100 includes a plurality of discrete light-emitting areas 101, where each light-emitting area 101 includes a plurality of micro light-emitting diodes 11 arranged in an array. The light homogenizing structure 200 includes a plurality of micro light homogenizing elements 201. The lens array 500 includes a plurality of lenses 501 and can be manufactured by a wafer-level optical lens process or a plastic injection molding process. The plurality of micro light homogenizing elements 201 of the light homogenizing structure 200 are configured between the light-emitting element array 100 and the lens array 500. Each micro light homogenizing element 201 corresponds to a light-emitting area 101, and each lens 501 corresponds to a light-emitting area 101. The infrared light-emitting element array 300 includes a plurality of infrared micro light-emitting diodes 21 arranged in an array form, and the infrared micro light-emitting diodes 21 are respectively configured in the light-emitting element array 100.

In an embodiment, the control unit 700 may be, for example, a central processing unit (CPU), a microprocessor, a digital signal processor (DSP), a programmable controller, a programmable logic device (PLD), or other similar devices, or a combination thereof, and the disclosure is not limited thereto. Furthermore, in an embodiment, each function of the control unit 700 may be implemented as a plurality of program codes. These program codes will be stored in a memory, and the control unit 700 will execute these program codes. Alternatively, in an embodiment, each function of the control unit 700 may be implemented as one or more circuits. The disclosure is not limited to using software or hardware to implement each function of the control unit 700.

As shown in FIG. 1A, the control unit 700 connects the micro light-emitting diodes 11, the infrared micro light-emitting diodes 21, and the light sensing elements 31. The light emission intensity of each micro light-emitting diode 11 is independently controlled by the control unit 700, and the number of the light sensing elements 31 is not limited to a plurality of light sensing elements 31. In some embodiments, only one light sensing element 31 may be configured.

In the embodiment, the infrared micro light-emitting diodes 21 and the light sensing elements 31 are configured to perform ranging on a target to be illuminated. Specifically, the infrared micro light-emitting diodes 21 are configured to generate infrared light, and the light sensing elements 31 are configured to sense the infrared light reflected from the target to be illuminated. The control unit 700 uses time-of-flight (ToF) ranging to generate a plurality of ranging data, and controls the current of each micro light-emitting diode 11 according to the ranging data, so that the micro light-emitting diodes 11 emit light to generate a plurality of light beams. The intensity of each light beam can be different to provide an optimized illumination effect or a specific illumination effect.

Each micro light homogenizing element 201 includes a light incident surface 201I and a light exit surface 201P. The light beam emitted by the micro light-emitting diode 11 enters the micro light homogenizing element 201 after passing through the light incident surface 201I of the corresponding micro light homogenizing element 201, and is emitted from the micro light homogenizing element 201 after passing through the light exit surface 201P thereof. The light beam further passes through the corresponding lens 501 and is formed into an illumination light beam LL.

As shown in FIG. 1B and FIG. 1C, since the illumination device 10 includes the plurality of light-emitting areas 101, the plurality of micro light homogenizing elements 201, and the plurality of lenses 501, each micro light homogenizing element 201 corresponds to a light-emitting area 101, and each lens 501 corresponds to a light-emitting area 101. Therefore, the illumination device 10 can generate a plurality of illumination light beams LL, and the intensities of the illumination light beams LL can be different from each other, and illuminate the target in a pixelated form.

Referring to FIG. 2, the number of the illumination light beams LL of the illumination device 10 illuminating in a pixelated form in a direction D1 and the number of the illumination light beams LL in a direction D2 perpendicular to the direction D1 are both 10, and the relative intensity of each illumination light beam LL (the numbers as shown in FIG. 2) can be different to provide an optimized illumination effect or a specific illumination effect. However, the disclosure is not limited thereto. In some embodiments, the number of the illumination light beams LL of the illumination device 10 illuminating in a pixelated form in the direction D1 and the number of the illumination light beams LL in the direction D2 perpendicular to the direction D1 may be greater than 10, so as to provide more a subtle illumination effect.

It should be noted that, as shown in FIG. 1C, the height of each micro light homogenizing element 201 provided in the embodiment in a traveling direction Z of the light beam is greater than the width of its light incident surface 201I, so that the light can be fully homogenized in each micro light homogenizing element 201 and then emitted from each micro light homogenizing element 201, and the micro light homogenizing element 201 can have a light guide function.

It should also be noted that each micro light homogenizing element 201 provided in the embodiment has a trapezoidal column shape as shown in FIG. 1C, and the area of the light exit surface 201P of each micro light homogenizing element 201 is greater than the area of the corresponding light incident surface 201I. In this case, each light incident surface 201I can be spatially spaced apart. Accordingly, each light-emitting area 101 corresponding to the light incident surface 201I can also be spatially spaced apart to improve the heat dissipation efficiency of the plurality of micro light-emitting diodes 11 in each light-emitting area 101, so as to prevent the illumination device 10 from overheating.

In some embodiments of the disclosure, the illumination device 10 is a flash of a portable electronic device, and each micro light-emitting diode 11 in the light-emitting element array 100 can emit white light with different color temperatures. The light homogenizing structure 200 includes glass or plastic, and can be manufactured by a plastic injection molding method, which is easy to manufacture and low in cost. The plurality of micro light homogenizing elements 201 of the light homogenizing structure 200 can be discretely disposed or integrally disposed. In some embodiments, the illumination device 10 may further include one or more lens elements (not shown) disposed on the light exit side of the light homogenizing structure 200 to optimize the illumination light beam LL emitted from the light exit surface 201P.

In some embodiments, the illumination device 10 can be a flashlight, and the light homogenizing structure 200 includes plastic, and can be manufactured by a plastic injection molding method, which is easy to manufacture, light in weight, and low in cost.

In order to fully explain various implementation aspects of the disclosure, other embodiments of the disclosure will be described below. It must be noted here that the reference numerals and a part of the contents in the previous embodiment are applicable to the following embodiments, in which identical reference numerals indicate identical or similar components, and repeated descriptions of the same technical contents are omitted. For the descriptions of the omitted parts, reference may be made to the foregoing embodiments and will not be repeated in the following embodiments.

Figure 3:
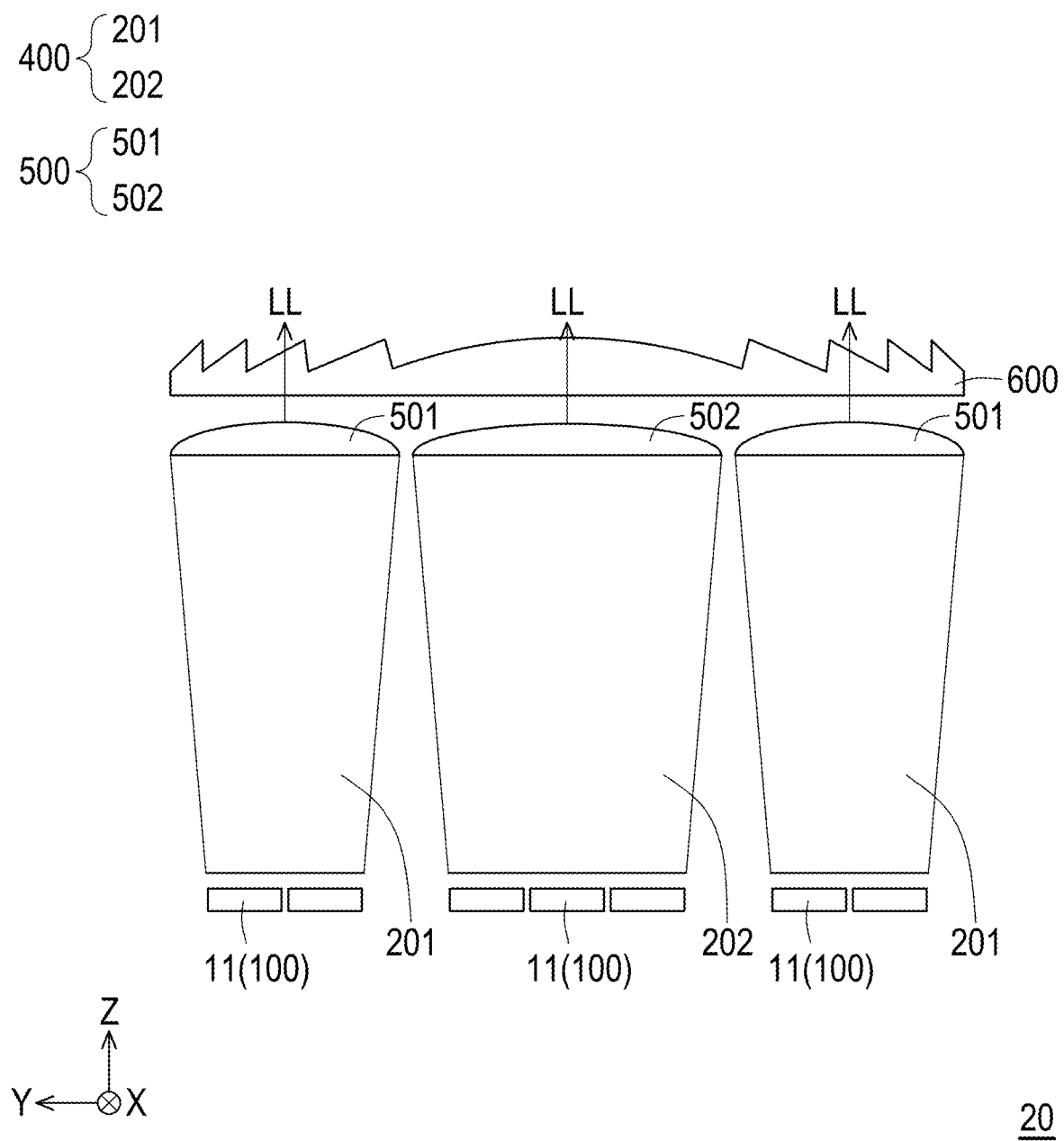
FIG. 3 is a schematic cross-sectional view of an illumination device according to an embodiment of the disclosure.

Referring to FIG. 3, FIG. 3 is a schematic cross-sectional view of an illumination device 20 according to an embodiment of the disclosure. The illumination device 20 includes the light-emitting element array 100, a light homogenizing structure 400, an infrared light-emitting element array (not shown), the lens array 500, a plurality of light sensing elements (not shown), and a control unit (not shown). The lens array 500 includes a plurality of lenses 501 and 502, and the light homogenizing structure 400 includes a plurality of micro light homogenizing elements 201 and 202. The arrangement of the infrared light-emitting element array, the light sensing element, and the control unit of the illumination device 20 is the same as the arrangement of the illumination device 10, and will not be repeated here.

As shown in FIG. 3, the illumination device 20 is different from the illumination device 10 in that the number of the micro light-emitting diodes 11 of the light-emitting area corresponding to the lenses 502 and the micro light homogenizing elements 202 and the number of the micro light-emitting diodes 11 of the light-emitting area corresponding to the lenses 501 and the micro light homogenizing elements 201 are different.

The illumination device 20 may also include a Fresnel lens 600, which is disposed on the light exit sides of the micro light homogenizing elements 201 and 202. The characteristics of the Fresnel lens 600 such as short focal length, small size, and thinness are configured to increase the illumination range of the illumination device 20.

To sum up the above, the illumination device provided by the embodiment of the disclosure uses infrared micro light-emitting diodes and light sensing elements to perform ranging on the illumination target. The plurality of micro light-emitting diodes emit light according to the ranging result, so that the illumination device can provide optimized illumination according to the distance (location) of the target. The illumination device also uses micro light homogenizing elements for homogenizing and guiding light, thereby providing pixelated, high-quality illumination light.

What is claimed is:

1. An illumination device, comprising:
    a light-emitting element array, comprising a plurality of discrete light-emitting areas, wherein each of the light-emitting areas comprises a plurality of micro light-emitting diodes arranged in an array;
    a lens array, comprising a plurality of lenses, wherein the plurality of lenses respectively correspond to the plurality of light-emitting areas;
    an infrared light-emitting element array, comprising a plurality of infrared micro light-emitting diodes arranged in an array, wherein the plurality of infrared micro light-emitting diodes are respectively disposed in the light-emitting element array;
    at least one light sensing element; and
    a control unit, connected to the plurality of micro light-emitting diodes, the plurality of infrared micro light-emitting diodes, and the at least one light sensing element,
    wherein the infrared micro light-emitting diodes are configured to generate infrared light, and the at least one light sensing element is configured to sense the infrared light reflected from a target to be illuminated so as to perform ranging on the target to generate a plurality of ranging data, the control unit controls a current of each of the micro light-emitting diodes to generate a plurality of light beams according to the plurality of ranging data, the plurality of light beams are formed into a plurality of illumination light beams after respectively passing through the plurality of lenses, and the plurality of illumination light beams illuminate the target in a pixelated form,
    wherein the plurality of infrared micro light-emitting diodes and the light-emitting element array are disposed on a same plane, the infrared light to be sensed is emitted between the micro light-emitting diodes, and the at least one light sensing element is adjacent to the micro light-emitting diodes.

2. The illumination device according to claim 1, further comprising a light homogenizing structure, wherein the light homogenizing structure comprises a plurality of micro light homogenizing elements disposed between the light-emitting element array and the lens array and respectively corresponding to the plurality of light-emitting areas, each of the micro light homogenizing elements comprises a light incident surface and a light exit surface, and after respectively entering the corresponding micro light homogenizing element through the corresponding light incident surface, the plurality of light beams are respectively incident on the corresponding lens.

3. The illumination device according to claim 2, wherein a height of each micro light homogenizing element in a traveling direction of the plurality of light beams is greater than a width of the light incident surface.

4. The illumination device according to claim 2, wherein the plurality of micro light homogenizing elements are integrally manufactured.

5. The illumination device according to claim 4, wherein the plurality of micro light homogenizing elements are manufactured by a plastic injection molding process.

6. The illumination device according to claim 2, wherein an area of the light exit surface of each of the micro light homogenizing elements is greater than an area of the light incident surface.

7. The illumination device according to claim 2, further comprising a Fresnel lens disposed on a light exit side of the plurality of micro light homogenizing elements.

8. The illumination device according to claim 1, wherein the plurality of light beams emitted by the plurality of light-emitting areas are white light.

9. The illumination device according to claim 1, wherein the plurality of micro light-emitting diodes have different color temperatures.

10. The illumination device according to claim 1, wherein the plurality of micro light-emitting diodes of the plurality of light-emitting areas have different numbers.

11. The illumination device according to claim 1, wherein the lens array is manufactured by a wafer-level optical lens process or a plastic injection molding process.

12. The illumination device according to claim 1, wherein a number of the light beams of the plurality of illumination light beams illuminating the target in a first direction and a number of the light beams in a second direction perpendicular to the first direction are greater than or equal to 10.

* * * * *